(12) United States Patent  
Hulme et al.

(10) Patent No.: US 6,210,192 B1
(45) Date of Patent: Apr. 3, 2001

(54) ASEXUAL CONNECTOR SYSTEM (76) Inventors: Matthew R. Hulme, 762 S. Van Ness Ave., San Francisco, CA (US) 94110; Aaron L. Hulme, 710 Clayton St., #4, San Francisco, CA (US) 94117

( * ) Notice: Subject to any disclaimer, the term of this patent is extended or adjusted under 35 U.S.C. 154(b) by 0 days.

(21) Appl. No.: 09/223,060

(22) Filed: Dec. 30, 1998

(51) Int. Cl.[7] .......................... H01R 13/28; H01R 25/00
(52) U.S. Cl. ...................... 439/293; 285/319; 285/321
(58) Field of Search ................................. 439/284, 290, 439/292, 285, 289; 285/79, 73, 84; 24/575, 579.1, 674; 446/85, 120, 117, 124

(56) References Cited

U.S. PATENT DOCUMENTS

| | | | |
|---|---|---|---|
| 1,263,252 | 4/1918 | Jencick | 464/157 |
| 1,461,958 | 7/1923 | Arnold | 285/305 |
| 2,171,726 * | 9/1939 | Howell | 439/286 |
| 2,417,195 | 3/1947 | Hargreaves | 310/258 |
| 2,439,161 | 4/1948 | Du Bois | 248/672 |
| 2,913,261 | 11/1959 | Matchett | 285/148.19 |
| 3,461,258 * | 8/1969 | Shlesinger | 200/253.1 |
| 3,637,238 | 1/1972 | Grosch | 285/39 |
| 3,689,113 | 9/1972 | Blaschke | 285/90 |
| 4,146,288 * | 3/1979 | Ramsay et al. | 439/316 |
| 4,391,459 | 7/1983 | Wicke et al. | 285/238 |
| 4,487,467 * | 12/1984 | Guerrero et al. | 439/285 |
| 4,569,106 | 2/1986 | Lovato | 24/615 |
| 4,595,251 * | 6/1986 | Moulin | 439/289 |
| 4,643,459 | 2/1987 | Carson | 285/84 |
| 5,184,851 | 2/1993 | Sparling et al. | 285/79 |
| 5,228,724 * | 7/1993 | Godeau | 285/93 |
| 5,301,985 | 4/1994 | Terzini | 285/79 |
| 5,333,915 | 8/1994 | Sparling et al. | 285/73 |
| 5,540,463 * | 7/1996 | Potokar | 285/319 |
| 5,658,159 * | 8/1997 | Gardner et al. | 439/294 |
| 5,779,277 | 7/1998 | Street | 285/79 |

* cited by examiner

*Primary Examiner*—Neil Abrams
*Assistant Examiner*—Michael C. Zarroli
(74) *Attorney, Agent, or Firm*—Townsend and Townsend and Crew LLP (57) ABSTRACT

An asexual connector system (2) includes first and second functionally identical connectors (4, 6), each connector having a base (8) with second locking surfaces (30), and one or more axially-extending, equally-spaced finger elements (10) with a groove (38), defining a first locking surface, formed therein. The first and second locking surfaces are positioned for complementary mating engagement when the first and second connectors are engaged. The base may includes a base body (14) and a deflectable ring spring (22) housed within a circumferential spring groove (20) formed in the base body; the ring spring defines the second locking surfaces in this embodiment.

17 Claims, 7 Drawing Sheets

ASEXUAL CONNECTOR SYSTEM

BACKGROUND OF THE INVENTION

Various types of asexual connector systems, that is connector systems in which each connector is identical to or the functional equivalent of the mating connector, have been designed for use for a variety of purposes. Asexual connectors have been designed for coupling tubes or conduits, electrical connectors, drive shafts, and even children's toys.

SUMMARY OF THE INVENTION

The present invention is directed to an asexual connector system in which first and second connectors are of relatively simple construction while providing sure, positive engagement of the connectors to one another.

The connector system includes first and second functionally identical connectors. Each connector includes a base and a number of connecting elements extending from the base in a chosen pattern. Each connecting element includes a first locking surface. The base includes a number of second locking surfaces. The first and second locking surfaces are positioned for complementary mating engagement when the first and second connectors are engaged.

The connecting elements may be equally-spaced finger elements extending from the base and arranged in a circle. The base may include a base body and ring spring housed within a circumferential spring groove formed in the base body. In this embodiment the ring spring defines the second locking surface and the first locking surfaces are created by grooves formed at the distal ends of the finger elements.

Functional equivalence means that any connector can be substituted for any other connector from a structural, functional standpoint. The connectors need not be identical; for example, the connectors may be different colors or have different logos or other markings on them and still be functionally equivalent. Also, functionally equivalent connectors need not be structurally physically identical; for example, some connectors could be provided with a serrated outer surface while others could have a smooth outer surface but both would be interchangeable and operate in the same way.

One of the primary advantages of the invention is its simplicity of design; the simple design helps to lower the cost of production to achieve an economically-produced connector. Also, the concept of asexual couplers reduces inventory costs because each coupler can be mated with any other coupler. Another advantage of the invention is that it preferably uses two ring springs to provide double the connecting force which would be available with many conventional coupler designs. Further, the couplers can be designed so that when joined to one another, the connector system exhibits generally cylindrical outer and inner surfaces making the connector system quite suitable for connecting pipes and hoses, electrical conduits and other situations in which relatively free path through the center of the connector is either desired or necessary. The couplers can also be designed with a solid center.

In a preferred embodiment the ring springs provide the resilient contact surfaces for essentially rigid finger elements. If desired, the finger elements could be made to be flexible so both the ring springs and the finger elements would provide flexing during the engagement and disengagement of the connectors. In another preferred embodiment the finger elements are flexible and engage inflexible grooves in the base body. The base body could also be designed with some type of flexible ridge or groove which could be engaged by rigid or flexible fingers as appropriate. Also, the groove formed in the fingers is, in a preferred embodiment, designed to permit the connectors to be engaged and disengaged using a reasonable amount of axial force. If desired, the grooves could be configured so that once the connectors are engaged, they would not normally be separable or only separable with the aid of a tool.

Other features and advantages of the invention will appear from the following description in which the preferred embodiments have been set forth in detail in conjunction with the accompanying drawings.

DESCRIPTION OF THE SPECIFIC EMBODIMENTS

FIGS. 1–4 illustrate an asexual connector system 2 made according to the invention. Connector system 2 includes first and second connectors 4, 6 which mate with one another to create connector system 2. Connectors 4, 6 are identical, or are at least functionally identical, so that all the connectors can be mated to one another. Because connectors 4, 6 of the preferred embodiment are identical, the invention will describe with reference to connector 6.

Figure 1:
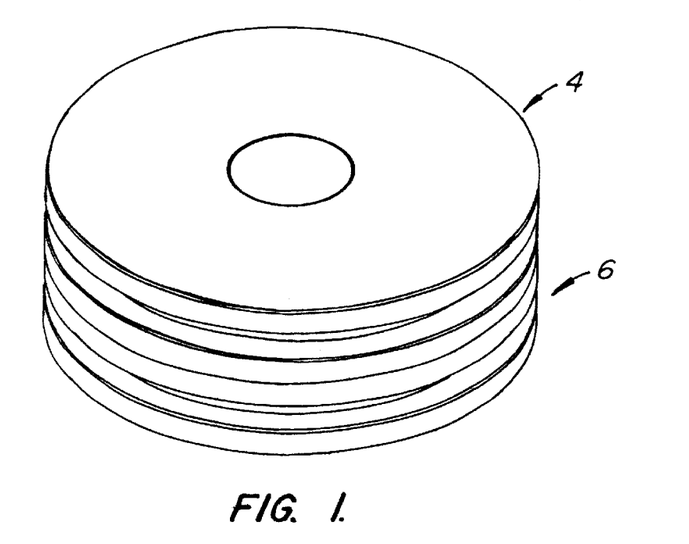
FIG. 1 is an axonometric view of an asexual connector system made according to the invention with two connectors fastened together.
Figure 2:
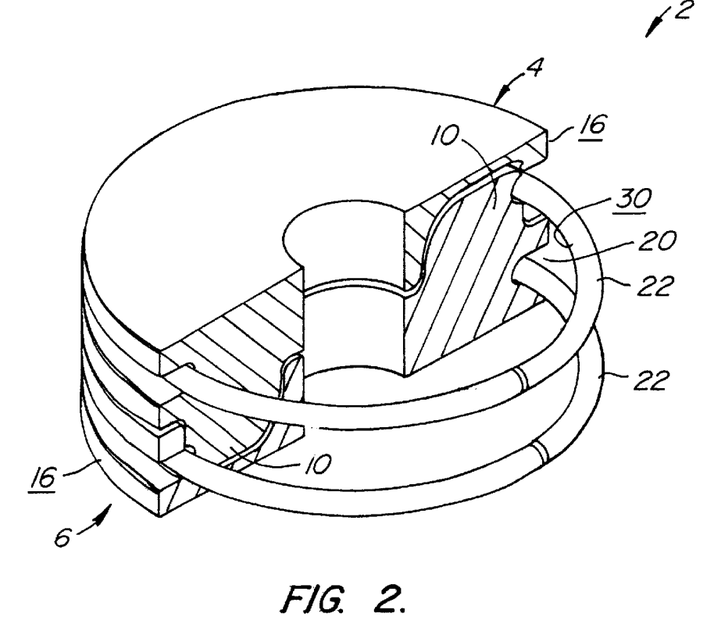
FIG. 2 is a partial cross-sectional view of the connector system of FIG. 1.
Figure 3:
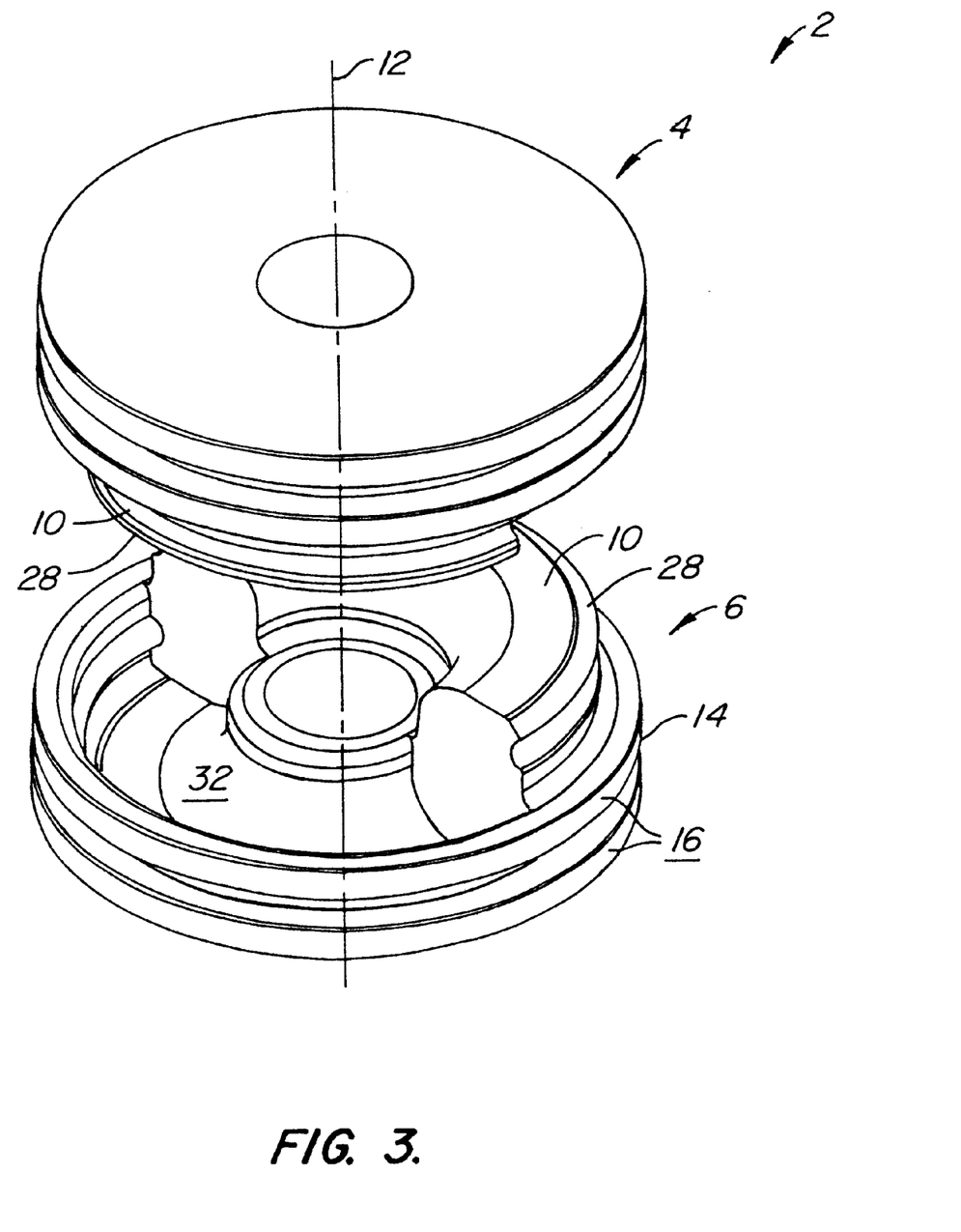
FIG. 3 is a partially exploded view of the connector system of FIG. 1.
Figure 4:
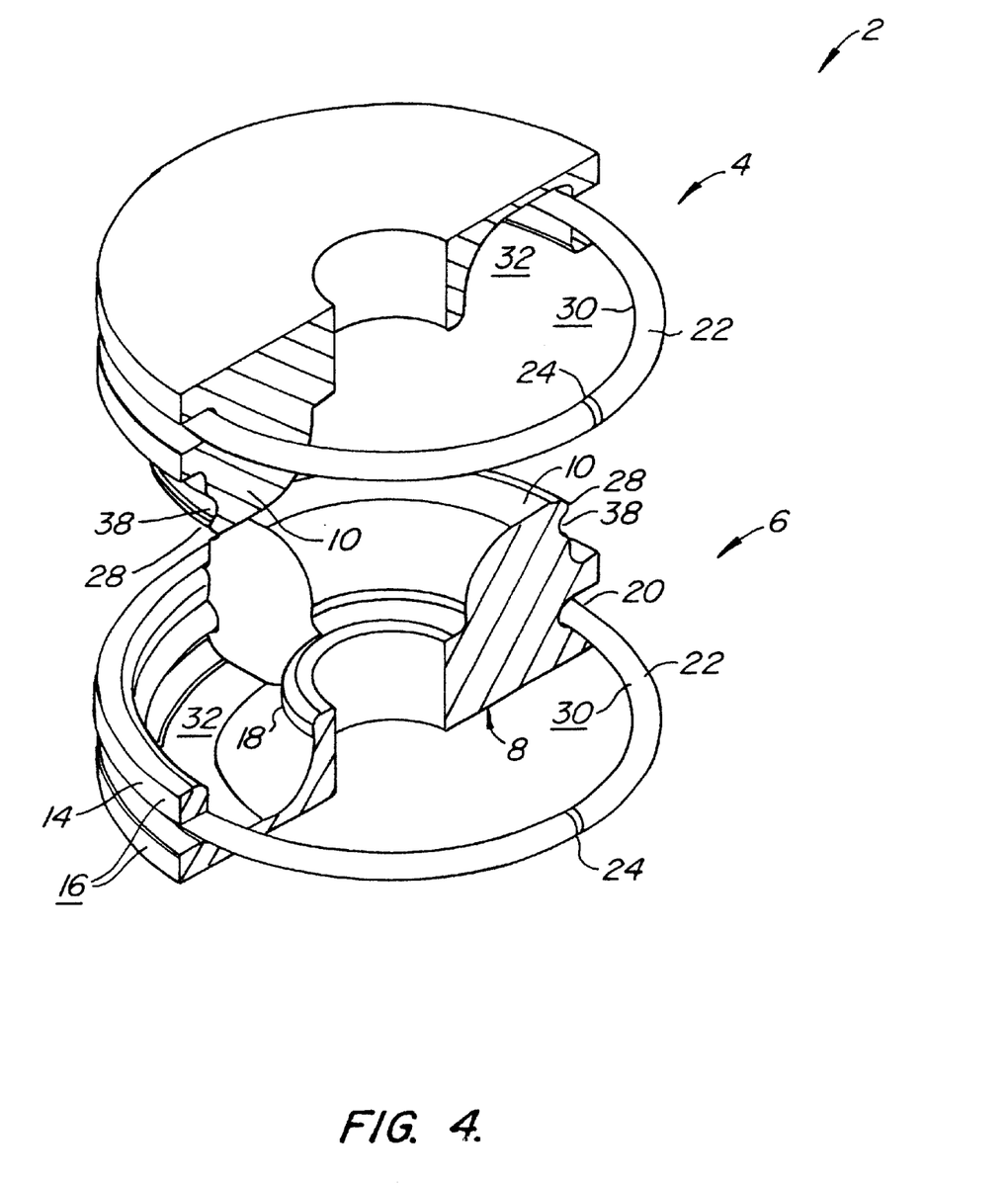
FIG. 4 is a partial cross-sectional view of the connector system of FIG. 3.

Connector 6, see FIGS. 3 and 4, includes a base 8 with an integrally molded finger element 10 extending therefrom parallel to the central axis 12 of connector system 2. Base 8 includes a generally cylindrical base body 14 having an outer circumferential surface 16 and an inner circumferential surface 18. A spring groove 20 is formed in outer circumferential surface 16 for receipt of a ring spring 22; thus, base 8 includes both base body 14 and ring spring 22. Ring spring 22 has a gap 24, see FIG. 4, to permit ring spring 22 to expand radially outwardly when connector 4 is fastened to connector 6 as shown in FIGS. 1 and 2. This fastening of the two connectors together is facilitated by provision of a tapered leading edge 28 of finger element 10. Leading edges 28 of one connector engage the inner surface 30 of ring spring 22 of another connector and thus cause ring spring 22 to expand outwardly a short distance as finger element 10 passes into finger cutout 32 formed in base body 14 of the other connector. As connectors 4, 6 engage, inner surface 30 of ring spring 22 engages a radially outwardly facing groove 38 formed in each finger element 10. Thus, each connector 4, 6 is secured to the other connector 6, 4 by the engagement of the ring springs 22 engaging grooves 38 in finger elements 10. Accordingly, grooves 38 in spring fingers 10 provide first locking surfaces for finger elements 10 while inner surface 30 of ring spring 22 provides a second locking surface engageable with the first locking surface.

Connector system 2 can be used in a variety of circumstances and for a variety of uses. For example, connectors 4, 6 can be formed at opposite ends of electrical conduits, water pipes or tubes. System 2 can also be used with children's building blocks; some or all of the building blocks could have more than two connectors as a part of the building block. Connectors 4, 6 can also be used as fasteners or snaps for two pieces of fabric or to mount, for example, two rigid members to one another.

Connectors 4, 6 can be made in shapes other than circular if desired. Connectors 4, 6 can have more than one finger element 10. Preferably the finger elements, or other connecting elements, are equally spaced. In certain circumstances it may be desired that when multiple finger elements 10 are used, the finger elements not be equally spaced; if not equally spaced the connectors will still have the finger elements exhibit bilateral or other symmetry. While in the preferred connectors the connectors can be removed by simply pulling them apart, separation can be premised upon the use of, for example, a tool to expand ring spring 22 associated with one or both connectors.

In use, connectors 4, 6 are oriented in an appropriate radial orientation. Finger element 10 of each connector 4, 6 passes into finger cutout 32 in the opposite connector 6, 4 until ring springs 22 of opposite connectors 6, 4 snap into and are housed within grooves 38 in finger elements 10 of connectors 4, 6. Connectors 4, 6 are disengaged by being pulled apart axially.

Figure 5:
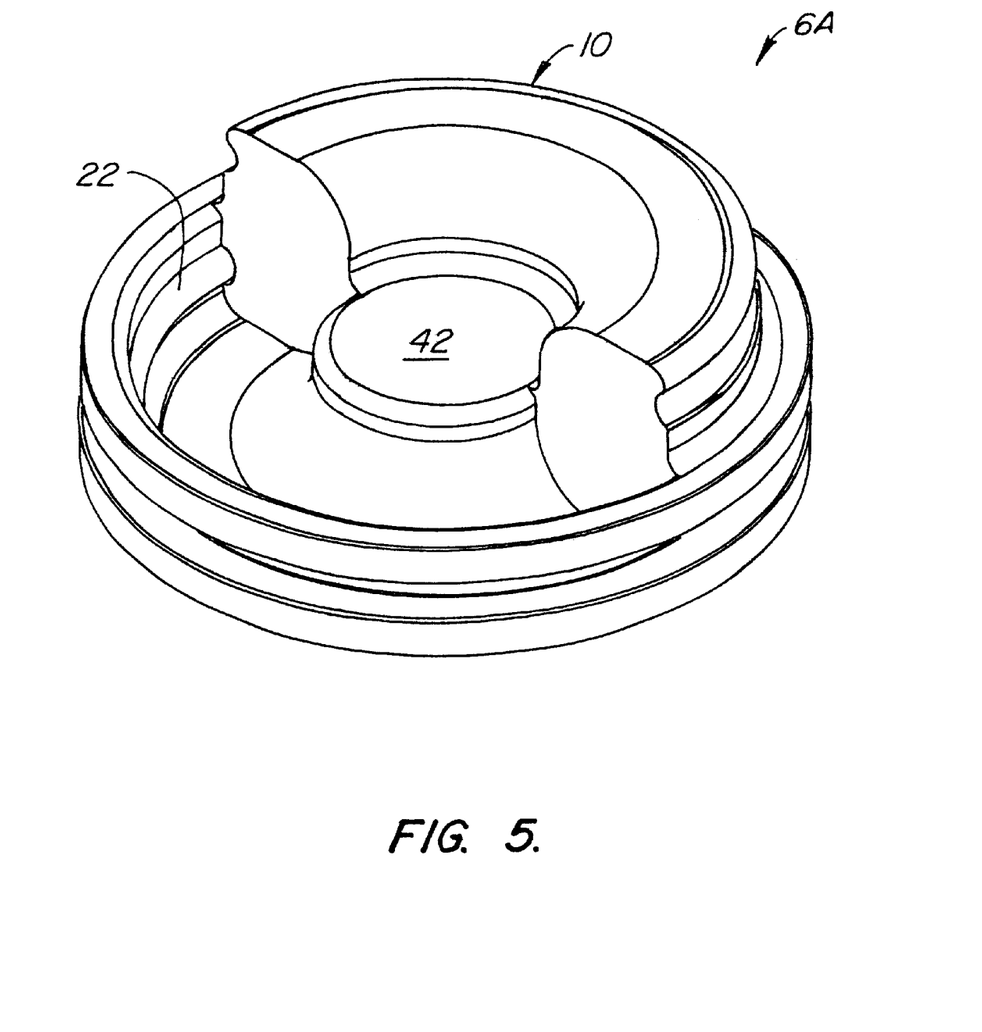
FIG. 5 is an overall view of an alternative embodiment of the connector of FIG. 3 having a solid center.
Figure 6:
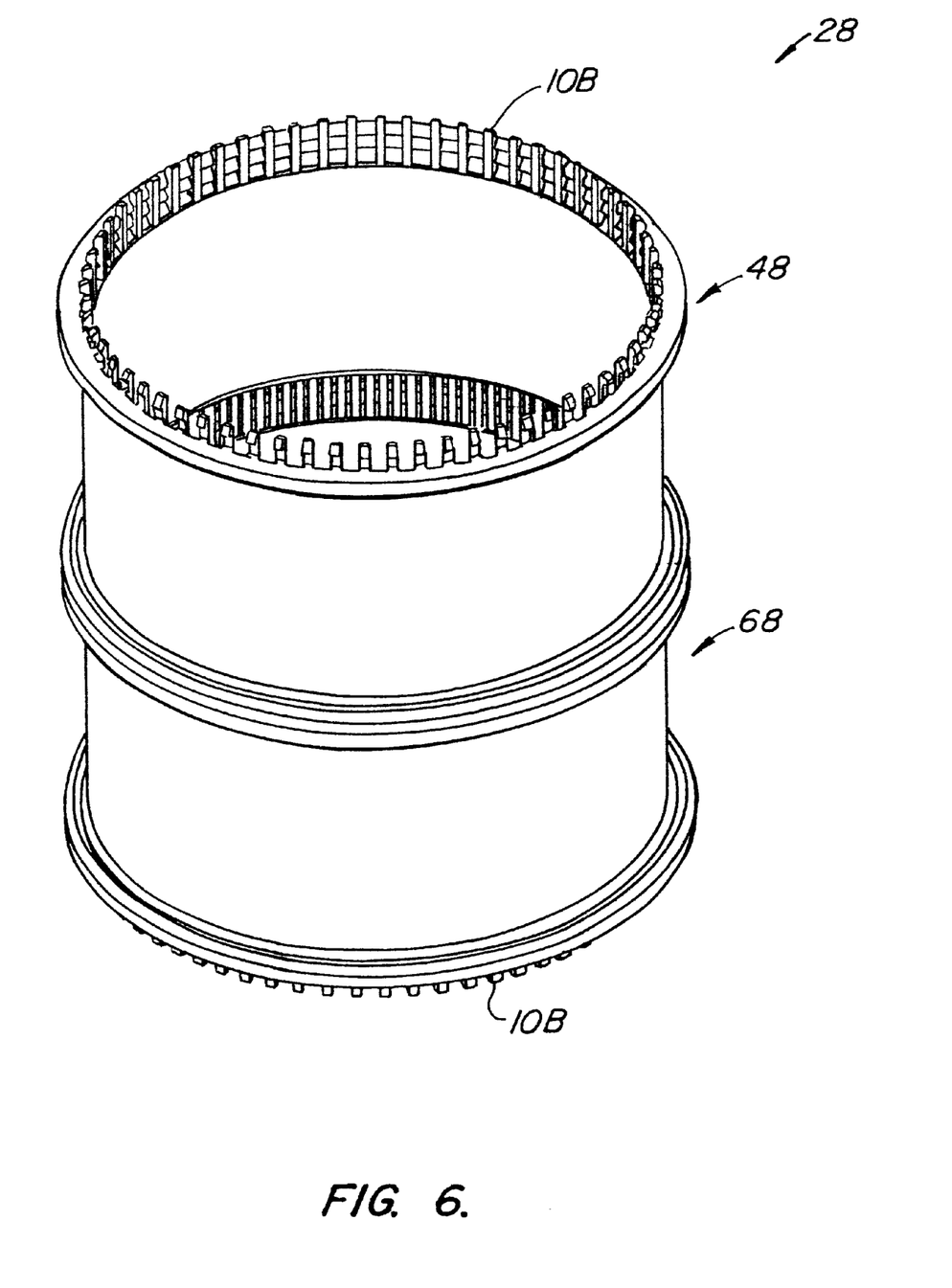
FIG. 6 is an overall view of a second alternative embodiment of the connector of FIG. 3 having flexible finger elements at each end.
Figure 7:
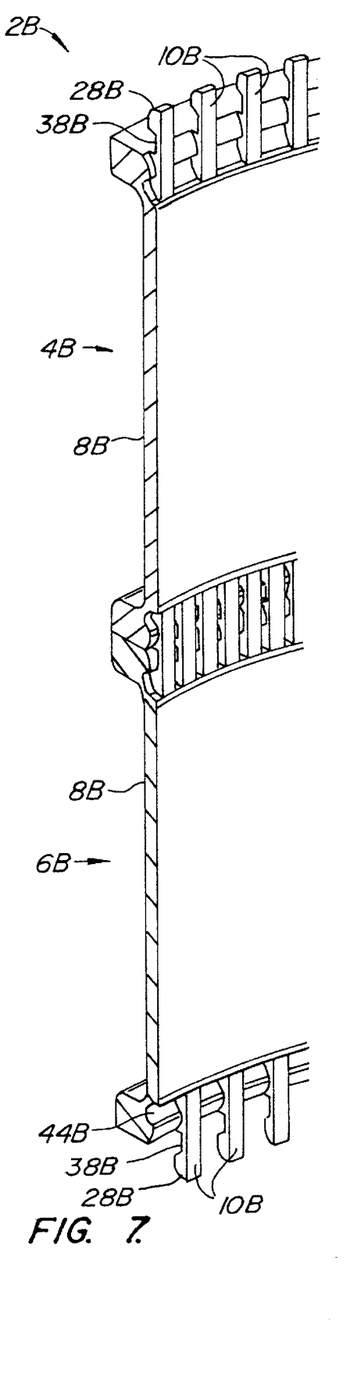
FIG. 7 is an enlarged partial cross-sectional view showing the engagement of two of the connectors of FIG. 6.
Figure 8:
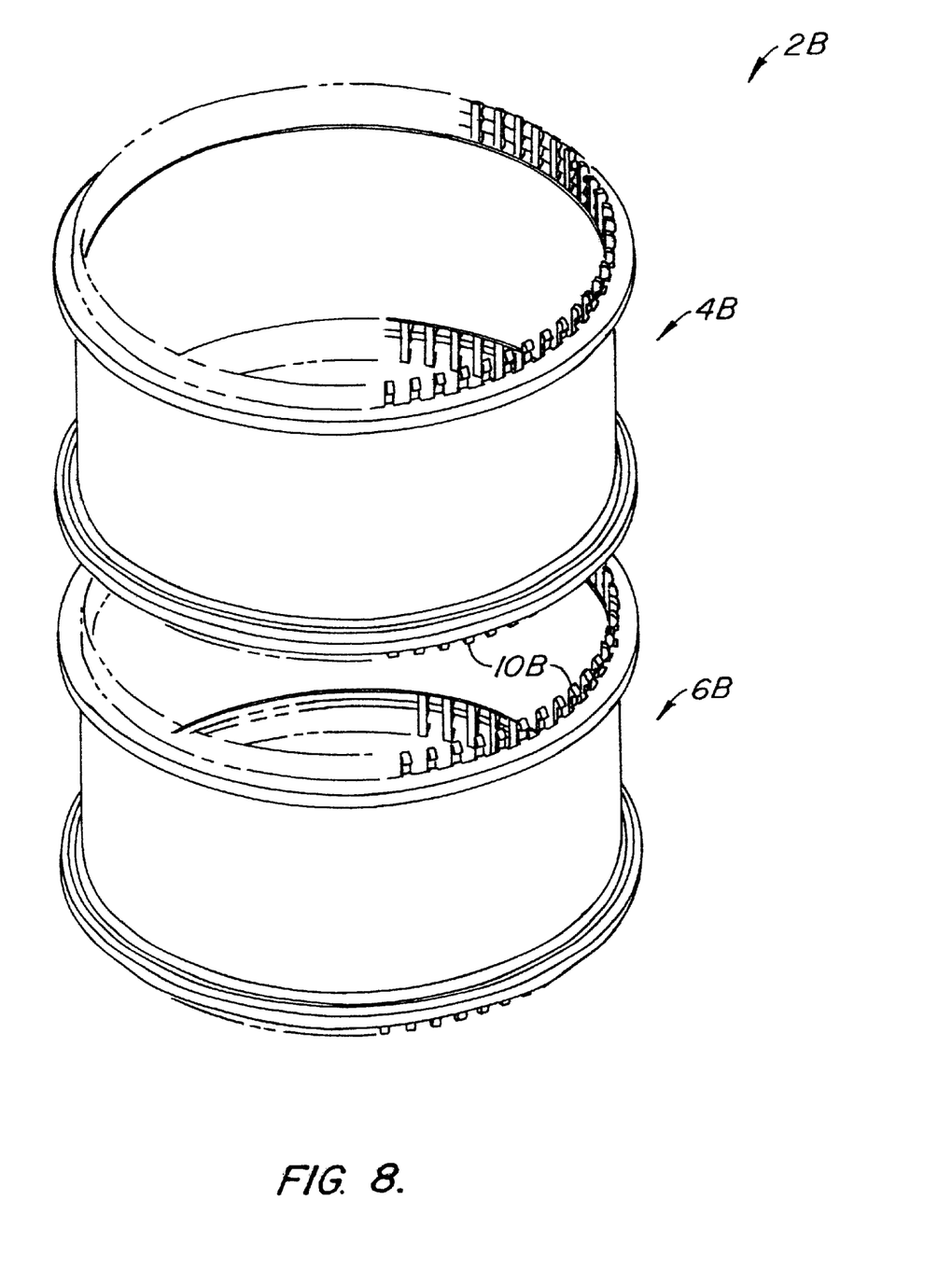
FIG. 8 shows the connectors of FIG. 6 in an exploded relationship.
Figure 9:
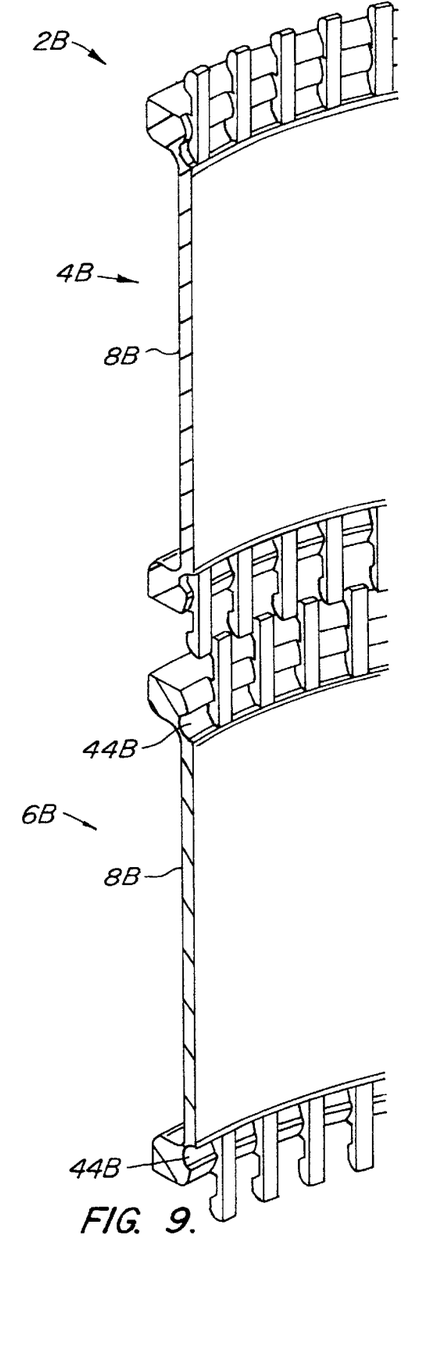
FIG. 9 is an enlarged partial cross-sectional view of the connectors of FIG. 8.

FIG. 5 illustrates an alternative embodiment of the invention similar to connector 6 of FIGS. 1–4 but including a solid central portion 42. Connector 6A works in a manner similar to that of connector 6 of FIGS. 1–4 but does not permit fluid flow through the center of the connector. Like connectors 4,6, a pair of connectors 6A can be joined in only a single rotary orientation. Of course, connector 6A could be modified to incorporate two, three or more connecting elements 10 if desired.

FIGS. 6–9 illustrate a further embodiment of the invention in which connectors 4B, 6B include flexible, resilient finger elements 10B, 64 finger elements in this embodiment. Each connector includes a tapered leading edge 28B at the distal end of the finger element with a groove 38B adjacent to leading edge 28B. When joined together, finger elements 10B deflect radially inwardly and then snap back into place so that radially outwardly extending leading edge 28B of each finger element 10B engages a correspondingly positioned groove or recess 44B formed in base 8B. The use of resilient finger elements eliminates the need for using spring 22. The double-ended embodiment of FIG. 6 permits connectors 4B, 6B to be mounted to one another in a continuous string.

The embodiment of FIGS. 6–9 illustrate a base 8B having a substantial axial dimension. If desired, base 8B could be much shorter or longer than that illustrated.

Base body 14, 14A and 14B and finger elements 10, 10B are preferably of materials such as plastics, metal, vinyl, wood, glass. The material is preferably relatively rigid and durable and is preferably moldable. In one preferred embodiment the base body 14 and finger elements are made as a one-piece injection molded part of acetal or nylon. Also, base body 14 and finger elements 10 could be made as two separate elements, such as a plastic base body and metal finger elements, secured to one another to create a unitary base body structure to which ring spring 22 is mounted.

Ring spring 22 is typically made of a spring steel.

Modification and variation can be made to the disclosed embodiments without departing from the subject of the invention as defined in the following claims. For example, the connectors need not use any resilient elements; for example, the finger elements could be flexible and a locking ring could be urged into position over the flexible finger elements of two mated connectors to secure the connectors together.

What is claimed is:

1. An asexual connector system comprising:
   first and second functionally identical connectors, each connector comprising:
   a base;
   a plurality of connecting elements extending from the base in a chosen pattern, each said connecting element comprising a first locking surface; and
   the base comprising a second locking surface, said second locking surface being a deflectable surface; and
   said first and second locking surfaces of said first connector positioned for complementary mating engagement with the respective second and first locking surfaces of said second connector so to secure said connectors together.

2. The connector system according to claim 1 wherein said base is generally cylindrical.

3. The connector system according to claim 1 wherein said connecting elements comprise equally-spaced finger elements.

4. The connector system according to claim 3 wherein the finger elements are arranged in a circle.

5. The connector system according to claim 3 wherein said first locking surface of each said finger element comprises a recess.

6. The connector system according to claim 3 wherein said base comprises a finger cutout between said fingers, said finger cutout of said first and second connectors sized for receipt of at least parts of the fingers of the second and first connectors.

7. The connector system according to claim 3 wherein said connectors each comprise sixty-four finger elements.

8. The connector system according to claim 1 wherein the base defines an axis and said connecting elements extend from the base in directions generally parallel to the axis.

9. The connector system according to claim 8 wherein the directions include opposite directions.

10. The connector system according to claim 1 wherein said base comprises:
    a base body;
    a circumferential spring groove formed in the base body;
    a ring spring within said spring groove; and
    said ring spring having a surface defining said second locking surfaces.

11. The connector system according to claim 10 wherein said connecting element and said base body comprise a unitary, one-piece element.

12. The connector system according to claim 1 wherein said connecting element is a substantially rigid element.

13. The connector system according to claim 1 wherein the connectors are generally circular with an open interior.

14. The connector system according to claim 1 wherein the connectors are generally circular with a closed interior.

15. An asexual connector system comprising:
   first and second functionally identical connectors, each connector comprising:
      a base;
      a plurality of finger elements extending from the base in a chosen pattern, each said finger element comprising a distal end and a first locking surface;
      the base comprising:
         a base body;
         a circumferential spring groove formed in the base body;
         a ring spring within said spring groove;
         said ring spring having a surface defining a plurality of second locking surfaces, said second locking surfaces being deflectable surfaces; and
         finger cutouts between said fingers, said finger cutouts of said first and second connectors sized for receipt of at least parts of the fingers of the second and first connectors;
   said first and second locking surfaces of said first connector positioned for complementary mating engagement with the respective second and first locking surfaces of said second connector so to secure said connectors together.

16. An asexual connector system comprising:
   first and second functionally identical connectors, each connector comprising:
      a base;
      a plurality of connecting elements extending from the base in a chosen pattern, each said connecting element comprising a first locking surface, said connecting elements comprising equally-spaced finger elements; and
      the base comprising a second locking surface and finger cutouts between said fingers, said finger cutouts of said first and second connectors sized for receipt of at least parts of the fingers of the second and first connectors; and
   said first and second locking surfaces of said first connector positioned for complementary mating engagement with the respective second and first locking surfaces of said second connector so to secure said connectors together.

17. An asexual connector system comprising:
   first and second functionally identical connectors, each connector comprising:
      a base;
      a plurality of connecting elements extending from the base in a chosen pattern, each said connecting element comprising a first locking surface; and
      the base comprising:
         a base body;
         a circumferential spring groove formed in the base body;
         a ring spring within said spring groove; and
         said ring spring having a surface defining a second locking surfaces; and
   said first and second locking surfaces of said first connector positioned for complementary mating engagement with the respective second and first locking surfaces of said second connector so to secure said connectors together.

* * * * *